June 3, 1952  A. P. SMITH  2,599,495
PORTABLE RIM-DRIVEN CIRCULAR SAW
Filed Sept. 3, 1946  2 SHEETS—SHEET 1
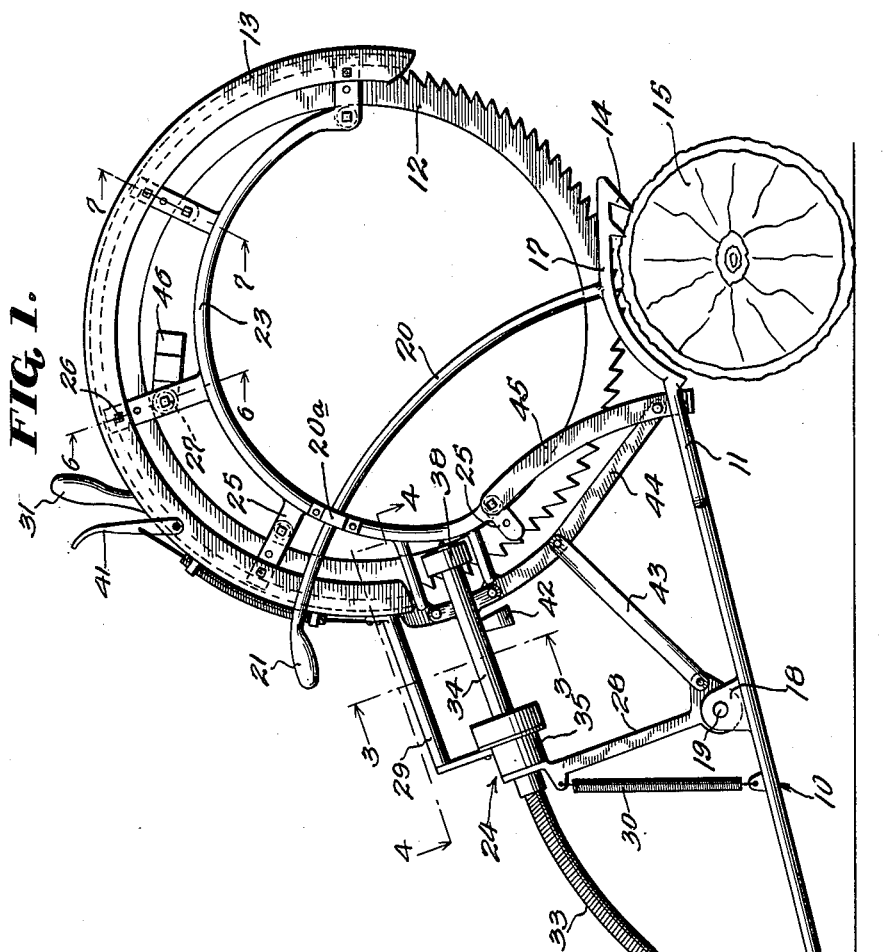
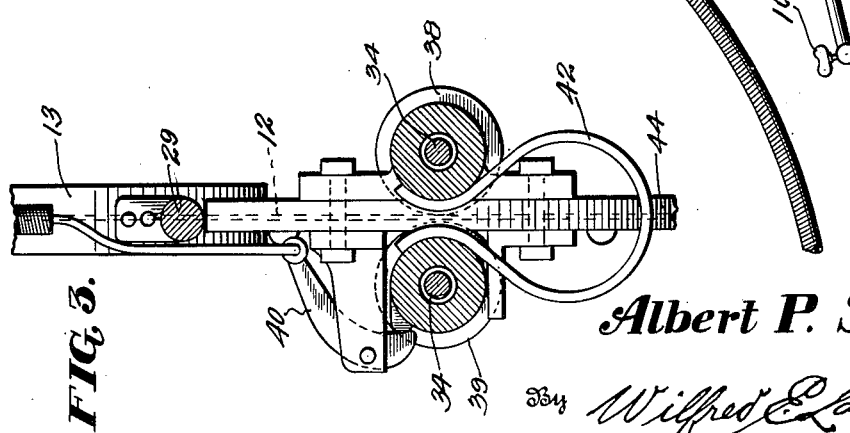
Inventor
*Albert P. Smith*
By *Wilfred E. Lawson*
Attorney

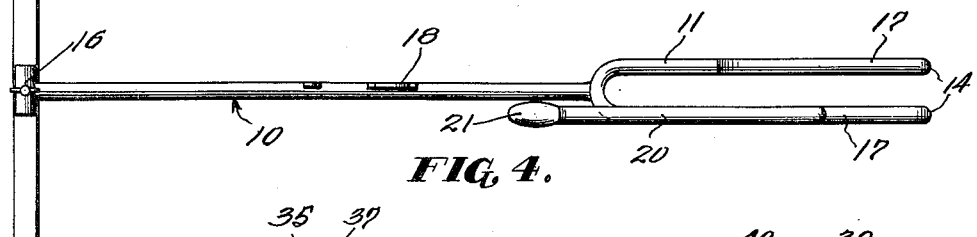
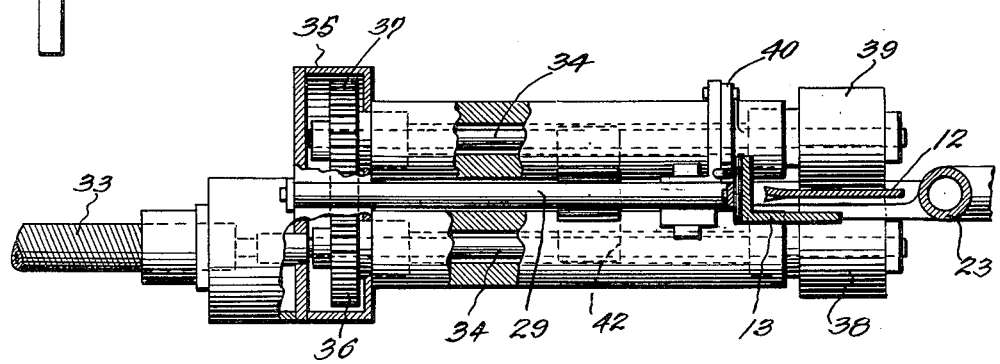
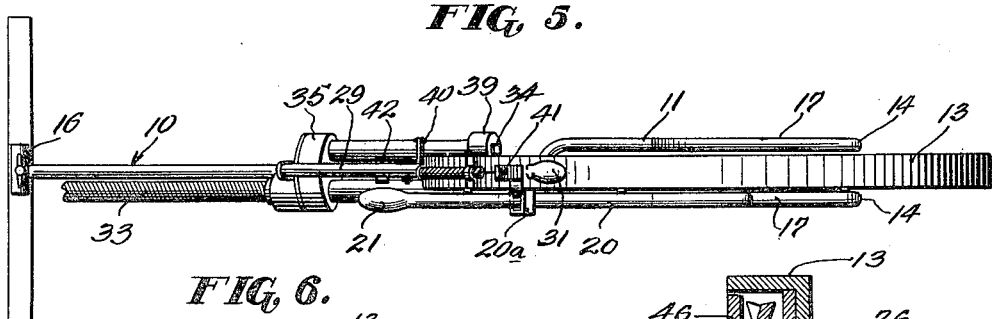
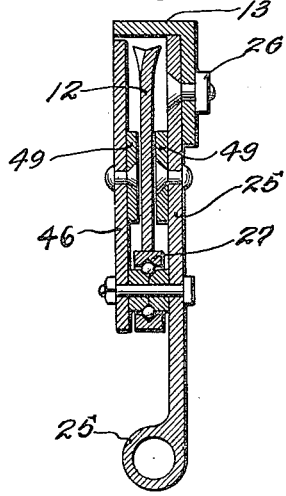
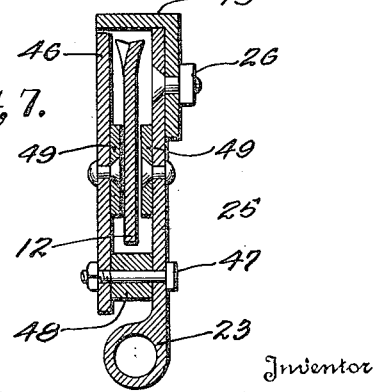

Patented June 3, 1952

2,599,495

UNITED STATES PATENT OFFICE 2,599,495

PORTABLE RIM-DRIVEN CIRCULAR SAW

Albert P. Smith, Ava, Mo., assignor, by mesne assignments, to Barker Saw Company, Springfield, Mo., a corporation of Missouri Application September 3, 1946, Serial No. 694,525

5 Claims. (Cl. 143—44)

1

The present invention is an improvement on the circular or ring saw for cutting logs crossways described in my co-pending application, Serial No. 603,771, filed July 9, 1945, and issued October 23, 1951, as Patent No. 2,572,065.

One object of this invention is to provide a saw of that class which is light enough to be handled by one man and rigid and strong enough to be applied in the proper place on a log by one hand, while the cutting action is controlled by the other hand.

This machine saw consists of four main parts, namely, first, a support, or anchoring member for securing the machine on a log, where the cut is to be made; second, a semi-circular frame hinged on the support and adapted for gradually increasing the depth of the cut; third, a guard secured on the frame over the saw teeth to protect the operator and guide the ring-shaped saw blade during operation; and fourth and last, the actuating mechanism for running the saw.

Other objects and advantages of the invention will be understood from the following description with the aid of the attached drawing which is part of the application.

Figure 1 is a side elevation of the circular saw;

Figure 2 is a top plan view of the anchoring member;

Figure 3 is a section on a plane along line 3—3 of Figure 1;

Figure 4 is a top plan view of the actuating mechanism as seen from line 4—4 of Figure 1 and in larger scale;

Figure 5 is a top plan view of Figure 1 showing the entire machine saw;

Figure 6 is a radial section on a plane along line 6—6 of Figure 1, showing roller bearings for the saw blade; and Figure 7 is a similar view taken along line 7—7 of Figure 1 showing solid spacers.

The base member or anchoring support which is denoted by numeral 10 is shaped like a fork with two prongs 11 placed far enough apart to straddle the saw blade 12 in its curved guard 13 of L-shaped section to permit advancing of the saw blade to increase the depth of the cut in the log.

At the end of the prongs are provided hooks 14 for firmly holding the log 15 during operation, while the opposite end of the support 10 is provided with a thumb screw 16 or other means for anchoring the rear end thereof on a stump or other fixed object in the ground.

It will be understood that the anchoring support 10 thus remains stationary during the entire sawing operation, while the saw 12 itself can be raised or lowered on said support as the work proceeds.

The prongs 11 are slightly arched at 17, near their hooked ends, in order that the hooks 14 may be able to reach down on the offside of the log and not to rest on the top of the arched surface of the log. About midway between the thumb screw 16 and the beginning of the forked portions 11 is shown a lug 18, with a bolt 19 which forms the fixed pivot point for the oscillatable parts of the machine. Curved on a radius from this pivot point 19, a stiff arm 20 extends upwardly from the left prong 11 and a guide strap 20a on the tube frame 23 is shown for the arm 20, which terminates with a handgrip 21, by means of which the hooks can be pressed into the bark of the log 15 to keep the support anchored during the sawing operation.

The members 10, 11, 14, 17, 18, 20 and 21 thus constitute a rigid unit which is preferably forged of iron and on which the saw proper is mounted to oscillate.

The moving parts of this machine saw which oscillate on the pivot 19 at lug 18, comprise the ring saw blade 12, the guard 13, the tube frame 23 and the actuating mechanism 24.

The saw blade 12 consists of a narrow ring with ordinary saw teeth around its exterior periphery. The blade is carried on roller bearing 27 in the guard member 13 which is of L-shape cross section and semi-circular contour fitting over the top of the teeth of the saw blade with a narrow space between, for clearance.

Within this guard member 13, which is concentric with the circular saw blade 12, is secured thereto by radial arms 25, the tube frame 23, which is also of semi-circular contour, but mounted eccentrically to the guard and saw blade, and, is held to the guard 13 by bolts or rivets 26. Straps 46, see Figures 6 and 7, are also provided on the other side of the blade on the bolts 47 in the frame 23 within the guard member 13, and carrying rollers 27 upon which the saw blade 12 is supported by contacting with its inner periphery with the surfaces of the roller or ball bearings 27 so as to run freely around in said guard member 13. On the inner surfaces of members 25 and 46 are shown guide strips 49 for the blade and a spacer block 48 (Fig. 7) in place of the bearings 27. These straps 46 can be turned down sideways as illustrated in Figure 1, by loosening bolts 47 slightly. This is in order to facilitate exchange of the saw blade in the guard member 13.

At the left side of Figure 1 is seen how the guard member 13 with the frame 23 is hingedly supported by means of a bracket 28 with a handhold 29 on the hinge bolt 19 in the lug 18 of the base member 10.

This rigid construction of guard members 13 and bracket 28 is held up from the base member by a spring 30, so that the saw blade 12 does not contact with the log 15 unless the operator forces the movable parts down by pushing on the operating handle 31 secured on the outer surface of the guard 13 or on the hand-hold 29.

At 33 is shown a flexible shaft or cable with a switch for supplying power to rotate shaft 34, mounted in a bearing 35 on the bracket 28. There are two parallel shafts 34 in housing 34' with meshing gears 36, 37 in the casing 35, in Figure 4. The inner ends of the shafts 34 each carries a friction roller 38 or 39, one on each side of the saw blade 12. By means of a clutch member 40, pivoted on the guard 13, and a clutch handle 41 the two rollers 38, 39 are brought together against the saw blade 12 to set it revolving in the guard 13. See Fig. 3. Normally, said friction rollers are forced apart by a flat spring 42 acting against the sides of the housings 34' for the shafts 34.

Between the bracket 18, the guard 13 and the frame 23 is provided a set of hinged links 43, 44, 45 in addition to the stiff structure of the bracket 28 and hand-hold 29.

The operation of this machine saw is the following:

With the machine saw assembled as shown in Figs. 1 and 5, the operator, standing behind the machine, that is, to the left of said figures, first takes hold of handles 21 and 29 and places the machine as indicated in said figures with the hook-end of the base member 10 on top of the log 15 which is to be cut. Then he pushes down with his right hand on the handle 21 until the hooks 14 firmly grip the surface of the log and simultaneously, with his right hand presses on the operating handle 31 until the saw teeth touch the log. He now switches on the power and drawing handles 31 and 41 together presses rollers 38, 39 against the saw blade 12, the latter starts to revolve and cut into the log 15.

Continuing his pressure on handles 31, 41, while steadying the machine by the handle 21 with his right hand, the saw will cut deeper and deeper into the log.

It is to be understood that the invention as herein disclosed may be varied from the details described and shown without departure from the spirit of the subjoined claims.

I claim:

1. A log sawing machine of the character stated, comprising a relatively long base member adapted for connection at one end with a log to be sawed, an upstanding ear carried by the base member, a rigid bracket arm pivotally secured to the ear for oscillation in a vertical plane, a pair of rotatable power transmitting elements rigidly supported upon said bracket arm, an arcuate frame rigidly connected at one end with the power transmitting elements, an annular saw having cutting teeth around its periphery, means carried by the frame for rotatably supporting the saw, means forming a driving connection between the power transmitting elements and the saw whereby rotary motion is imparted to the saw, an arcuate guard member disposed around and covering substantially half the circumference of the saw upon the side thereof remote from the base, a rigid bar member secured between an end of the arcuate guard and said bracket and forming a handle for facilitating maintenance of the saw in working position, and rigid radially extending connecting members between the frame and said guard.

2. A log sawing machine comprising an elongated base member adapted for connection with a log to be sawed, a rigid bracket arm pivotally mounted upon said base member for oscillation in a vertical plane, a pair of rotatable power transmitting elements mounted upon said bracket arm, an arcuate frame connected at one end with the power transmitting elements, an annular saw having peripheral cutting teeth, support means carried by the frame for rotatably supporting the saw, a driving connection means between the power transmitting elements and the saw whereby the saw is rotated, an arcuate guard member disposed around and covering substantially half the circumference of the saw upon the side thereof remote from the base member, a handle for said machine comprising a body rigidly connected to said arcuate guard and to said bracket arm, means securing said guard to said frame.

3. The combination of claim 2 including a resilient member connected to said base member and to said bracket arm and yieldingly urging the former away from the latter.

4. The combination of claim 2 wherein said securing means comprise two sets of brackets disposed on opposite sides of said saw and connecting said guard to said frame, one set of brackets being removable to permit passage of said saw between said guard and frame.

5. The combination of claim 2 including brace means connected to said bracket arm adjacent the pivot thereof and rigidly connected to said guard and frame.

ALBERT P. SMITH.

REFERENCES CITED

The following references are of record in the file of this patent:

UNITED STATES PATENTS

| Number | Name | Date |
|---|---|---|
| 252,268 | Silcott | Jan. 10, 1882 |
| 775,247 | Reid | Nov. 15, 1904 |
| 915,808 | Tevis | Mar. 23, 1909 |
| 1,063,986 | Lowe et al. | June 10, 1913 |
| 1,395,100 | Fite | Oct. 25, 1921 |
| 1,428,208 | Bills | Sept. 5, 1922 |
| 1,775,692 | Plut | Sept. 16, 1930 |
| 1,997,619 | Windle | Apr. 16, 1935 |
| 2,310,152 | Ronning | Feb. 2, 1943 |
| 2,330,996 | Rivers | Oct. 5, 1943 |

FOREIGN PATENTS

| Number | Country | Date |
|---|---|---|
| 64,034 | Austria | Mar. 26, 1914 |
| 194,235 | Switzerland | Feb. 1, 1938 |